United States Patent
Kobayashi et al.

(10) Patent No.: US 6,817,291 B2
(45) Date of Patent: Nov. 16, 2004

(54) PRINTING-CYLINDER BEARING DEVICE

(75) Inventors: Yoshio Kobayashi, Tokyo (JP);
Nobuyuki Maruyama, Tokyo (JP);
Takashi Takebayashi, Kawasaki (JP);
Masashi Takenouchi, Kawasaki (JP);
Mutsuhito Yoneta, Tokyo (JP)

(73) Assignee: Tokyo Kikai Seisakusho, Ltd., Tokyo (JP)

( * ) Notice: Subject to any disclaimer, the term of this patent is extended or adjusted under 35 U.S.C. 154(b) by 37 days.

(21) Appl. No.: 10/308,426

(22) Filed: Dec. 3, 2002

(65) Prior Publication Data

US 2003/0167942 A1 Sep. 11, 2003

(30) Foreign Application Priority Data

Mar. 8, 2002 (JP) ........................................ 2002-062879

(51) Int. Cl.7 .................................................. B41F 5/00
(52) U.S. Cl. ....................................... 101/216; 101/218
(58) Field of Search ................................ 101/216, 218, 101/247; 384/247, 255, 256, 447

(56) References Cited

U.S. PATENT DOCUMENTS

| | | | | |
|---|---|---|---|---|
| 3,605,617 A | * | 9/1971 | Wieland | 101/218 |
| 5,234,270 A | | 8/1993 | Mathes | 384/461 |
| 5,257,866 A | | 11/1993 | Rennerfelt | 384/247 |
| 5,639,166 A | * | 6/1997 | Dittenhofer | 384/461 |
| 5,887,526 A | * | 3/1999 | Zahnd | 101/486 |
| 6,004,038 A | * | 12/1999 | Dittenhofer | 384/447 |
| 6,327,975 B1 | * | 12/2001 | Izawa | 101/170 |
| 6,668,721 B2 | * | 12/2003 | Naka | 101/218 |

FOREIGN PATENT DOCUMENTS

| | | |
|---|---|---|
| DE | 100 21 233 A1 | 10/2001 |
| JP | 2533040 | 6/1996 |
| JP | 2758346 | 3/1998 |

* cited by examiner

Primary Examiner—Anthony H. Nguyen
(74) Attorney, Agent, or Firm—McGlew and Tuttle, P.C.

(57) ABSTRACT

A printing-cylinder bearing device for rotatably supporting a printing cylinder 12 via a frame 6 in such a manner that the printing cylinder can be moved between a printing position and a non-printing position, comprising a radial-load supporting means 3 having between the frame 6 and a shaft 2 of the printing cylinder 12 at least an eccentric part that is rotatable around the centerline of a hole 13 provided on the frame 6, a housing 5 interlocked with the eccentric part and provided in such a manner as to inhibit the axial movement of the printing cylinder 12 with respect to the frame 6, a thrust loading supporting means 4 interposed between the housing 5 and the shaft 2 of the printing cylinder 12, and an eccentric part rotating means 8 for rotating the eccentric part around the centerline of the hole 13 on the frame 6 and holding the rotated position of the eccentric part.

19 Claims, 3 Drawing Sheets

PRINTING-CYLINDER BEARING DEVICE

BACKGROUND OF THE INVENTION

1. Field of the Invention

The present invention relates generally to a printing-cylinder bearing device for rotary presses, and more particularly to a blanket-cylinder and plate-cylinder bearing device that can be moved to a printing position and non-printing position.

2. Description of the Related Art

As to printing-cylinder bearing devices, one disclosed in Japanese Patent Publication No. 2533040 based on the claims of priority whose priority country is Federal Republic of Germany, and whose date and number of priority application are Aug. 10, 1991 and P4126545.9 is publicly known.

In the Japanese Patent Publication No. 2533040 disclosed is a printing cylinder bearing device for printing presses comprising an inner ring, an intermediate ring and an outer ring, all serving as a raceway, between which ball and roller rows are disposed. The inner ring of the bearing device is fitted into a journal of the printing cylinder, whereas the outer ring is fitted to a bearing casing.

The centerline of the inside diameter of the intermediate ring is aligned with the centerline of the shaft of the printing-cylinder, whereas the centerline of the outside diameter of the intermediate ring is aligned with the centerline of the bearing casing hole, and misaligned with the centerline of the inside diameter of the intermediate ring. That is, the outside diameter of the intermediate ring is eccentric to the inside diameter of the intermediate ring. The intermediate ring is caused to rotate in the circumferential direction around the centerline of the outside diameter as the fulcrum by a manipulating member disposed outside of the bearing casing. By causing the intermediate ring to rotate, the printing cylinder having the inside-diameter centerline of the intermediate ring aligned with the centerline of the shaft is also caused to move around the outside-diameter centerline of the intermediate ring.

The ball-and-roller bearing rows between the inner ring and the intermediate ring comprise cylindrical roller bearing row and ball bearing row or cross roller bearing row; the ball-and-roller bearing rows between the intermediate ring and the outer ring comprise cylindrical roller bearing row and ball bearing row.

The cylindrical roller bearing row is a bearing for supporting the radial load exerted in the radial direction of the printing cylinder, while the ball bearing row or the cross roller bearing row is a bearing for supporting the thrust loading exerted in the axial direction of the printing cylinder. If any one of these bearing rows having different actions provided side by side between the inner ring and the intermediate ring and between the intermediate ring and the outer ring is damaged, the entire assembly of the inner ring, the intermediate ring, the outer ring and the ball-and-roller bearing rows disposed there between has had to be replaced.

The inner ring of the bearing device is fitted to the journal of the printing cylinder to prevent axial movement, and the outer ring of the bearing device is fitted to a hole provided on the bearing case of the printing cylinder to prevent axial movement. The radial and thrust loadings exerted in the axial and radial directions of the printing cylinder are transmitted to the inner ring, intermediate ring and outer ring, and bearing casing of the bearing device. The cylindrical roller bearing row of the two bearing rows provided between the inner ring and the intermediate ring and between the intermediate ring and the outer ring sustains the radial load, while the ball bearing row or the cross roller bearing row sustains the thrust loading. The construction where loads are sustained by a plurality of bearing rows and a plurality of bearing-row stages in this way tends to cause large play, and the play due to thrust loading tends to be compounded due to the accumulation of plays in the bearing rows between the inner ring and the intermediate ring and between the outer ring and the intermediate ring.

A printing-cylinder bearing device where a radial bearing and a thrust bearing are independently provided, on the other hand, is disclosed in Japanese Patent Publication No. 2758346, based on the claims of priority whose priority country is Federal Republic of Germany, and whose date and number of priority are Aug. 21, 1992 and P4227643. In this bearing device, a radial bearing is provided on the shaft of the printing cylinder to sustain the radial load exerted in the radial direction of the printing cylinder, and a thrust bearing is disposed in such a manner that the printing-press frame to which the radial bearing is fitted is sandwiched on both sides by the thrust bearing to sustain the thrust loading exerted in the axial direction of the printing cylinder. This bearing device, however, is a stationary bearing which is not designed to move the printing cylinder between the printing position and the non-printing position.

SUMMARY OF THE INVENTION

It is an object of the present invention to provide a printing-cylinder bearing device which produces less plays in supporting the printing cylinder, and which assures easy maintenance since the loads exerted in the radial and axial directions of the printing cylinder are sustained by separate bearings, and any of them can be easily replaced with new one even when damaged.

It is another object of the present invention to provide a printing cylinder bearing device having an eccentric part to allow the printing cylinder to move between the printing position and the non-printing position.

It is still another object of the present invention to provide radial-load supporting means having a construction having an eccentric part that is rotated around the centerline of a hole provided on a support member and has a hole whose centerline is misaligned with the centerline of the hole provided on the support member so as to sustain the radial load acting in the radial direction of the printing cylinder.

It is a further object of the present invention to provide a bearing construction and a bearing that are suitable for carrying the radial load of the printing cylinder.

It is a still further object of the present invention to provide a printing-cylinder shaft construction and a bearing that are suitable for carrying the thrust loading acting in the axial direction of the printing cylinder.

It is a still further object of the present invention to provide means for driving an eccentric part to rotate it so that the printing cylinder can be moved between the printing position and the non-printing position.

In the disclosed embodiments, the printing-cylinder bearing device that causes the frame to support the printing cylinder in such a manner that the printing cylinder can be rotated and moved between the printing position and the non-printing position comprises radial-load supporting means at least having between the frame and the printing cylinder shaft an eccentric part that can be rotated around the centerline of a hole provided on the frame and has a hole whose centerline is misaligned with the centerline of the hole provided on the frame, a housing that interacts with the eccentric part and inhibits the axial movement of the printing cylinder with respect to the frame, thrust-loading supporting means provided in between the housing and the printing cylinder shaft, and eccentric part rotating means that causes the eccentric part to rotate around the centerline of the hole provided on the frame and holds the position.

DETAILED DESCRIPTION OF THE PREFERRED EMBODIMENTS

In the following, the printing-cylinder bearing device embodying the present invention will be described, referring to the accompanying drawings.

Figure 1:
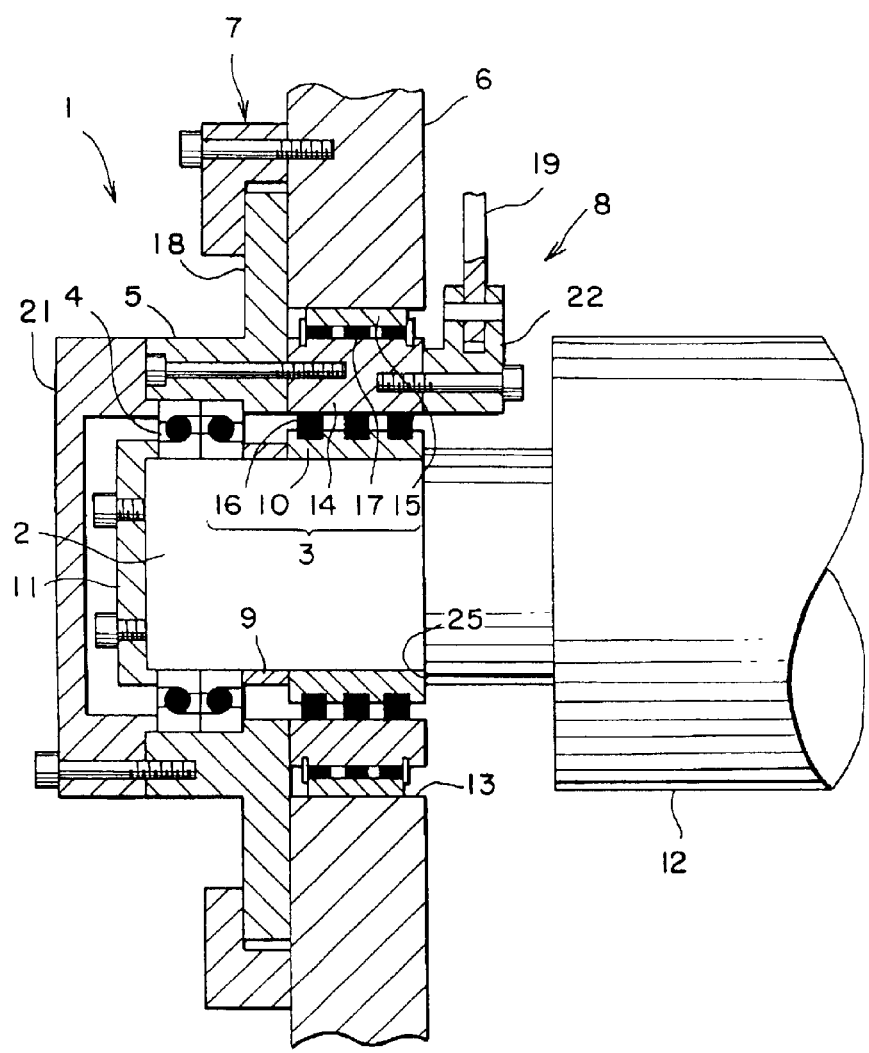
FIG. 1 is an approximate cross-sectional view of a printing cylinder bearing device as an embodiment of the present invention.

In FIG. 1, a printing cylinder 12 of a printing press is rotatably supported in the circumferential direction of the printing cylinder 12 by a bearing device 1 provided in a hole provided on a frame 6 that is a supporting member in the vicinity of both ends of the printing cylinder 12, and the printing cylinder 12 is supported in such a manner as to be movable between the printing position and the non-printing position.

In the figure, one bearing device 1 for the printing cylinder 12 embodying the present invention is shown, and a similar bearing device is also provided on the other end, though not shown in the figure.

The bearing device 1 comprises radial-load supporting means 3, thrust-loading supporting means 4, a housing 5, a frame 6 that is a supporting member, means 7 for axially holding the housing 5, and eccentric part rotating means 8. In the following, the construction of these components and other components adjacent thereto will be described.

(1) Shaft 2 of Printing Cylinder 12

A shaft 2 of the printing cylinder 12 is disposed on both sides in the axial direction of the printing cylinder 12 and of a smaller diameter than the outside diameter of the printing cylinder 12, and has radial-load supporting means 3 and thrust-loading supporting means 4, both of which will be described later, fitted thereto, and a shouldered part 25 so that the axial location of these load carrying means can be fixed.

(2) Radial-Load Supporting Means 3

The radial-load supporting means 3 is fitted to the shaft 2 of the printing cylinder 12 and to a hole 13 on the frame 6 in such a manner that the printing cylinder 12 is movable with respect to the frame 6. The radial-load supporting means 3 comprises an inner ring 10, an intermediate ring 14, an outer ring 15, a radial-load carrying cylindrical roller row having a plurality of cylindrical rollers 16 disposed along the outer circumferential surface of the inner ring 10 between the inner ring 10 and the intermediate ring 14, and a needle row or a radial-load carrying cylindrical roller row having a plurality of needles 17 or cylindrical rollers (similar to the cylindrical rollers 16) disposed along the outer circumferential surface of the intermediate ring 14 between the intermediate ring 14 and the outer ring 15.

[1] Inner Ring

The inner ring 10 is of a ring shape having a centerline at a different position from the centerline of the hole 13 on the frame 6, has an inside diameter equal to the outside diameter of the shaft 2 of the printing cylinder 12, and is fitted to the shaft 2.

[2] Intermediate Ring 14

The intermediate ring 14 has an inside diameter that shares a common centerline with the inner ring 10, and an outside diameter that is an eccentric ring-shaped member sharing a common centerline with the hole 13 of the frame 6. That is, the centerline of the inside diameter of the intermediate ring 14 is misaligned with the centerline of the outside diameter thereof. A plurality of cylindrical roller rows having a plurality of cylindrical rollers 16 disposed along the outer circumferential surface of the inner ring 10 that can sustain radial loads in the radial direction of the printing cylinder 12 are disposed between the intermediate ring 14 and the inner ring 10.

[3] Outer Ring 15

The outer ring 15 is a ring-shaped member sharing a common centerline with the hole 13 of the frame 6, fitted to the hole 13 of the frame 6.

A plurality of needle rows having a plurality of needles 17 disposed along the outer circumferential surface of the intermediate ring 14 are provided between the intermediate ring 14 and the outer ring 15. The needle rows sustain radial load in the radial direction of the printing cylinder 12, and support the intermediate ring 14 and the housing 5, which will be described later, connected to the intermediate ring 14 via bolts in such a manner as to cause the housing 5 to smoothly rotate around the centerline of the hole 13 of the frame 6 as the fulcrum.

The aforementioned needles 17 may be cylindrical rollers, for example.

(3) Thrust-Loading Supporting Means 4

The thrust-loading supporting means 4 is fitted to the shaft 2 to sustain thrust loadings acting on the printing cylinder 12 in the axial direction.

In this embodiment, a set of angular contact ball bearings is used as the thrust-loading supporting means 4. The angular contact ball bearings 4 as the thrust-loading supporting means 4 can sustain thrust loading. Since the direction of sustaining load is fixed, a set of the angular contact ball bearings 4 is disposed face-to-face or back-to-back in the loading direction to sustain axial thrust loadings in both directions, as shown in FIG. 1.

A collar 9 is provided between the inner ring 10 having cylindrical roller rows of the radial-load supporting means 3 and the angular contact ball bearings 4 to hold the inner ring 10 and the angular contact ball bearings 4 in place in the axial direction. A bearing holding member 11 provided at an end of the shaft 2 applies a predetermined pressure onto the inner ring 10 having the cylindrical roller rows and the angular contact ball bearings 4.

(4) Housing 5

The housing 5 is of a ring shape having an L-shaped half section. The housing 5 is made integral with the intermediate ring 14 as an end face on the side of an L-shaped projection 18 is connected to the intermediate ring 14 of the radial-load supporting means 3 via bolts. Since a surface on the side of the frame 6 of the projection 18 near to the radial outside of the end face is caused to make contact with the side surface of the frame 6, the axial movement of the printing cylinder 12 is inhibited and held in place by housing axially holding means 7, which will be described later. The centerline of a hole on the housing 5 agrees with the centerline of the printing cylinder 12, and the diameter of the hole is equal to the outside diameter of the angular contact ball bearings 4 so that the angular contact ball bearings 4 are fitted to the hole.

The bearing holding member 21 holds the angular contact ball bearings 4 in place in the axial direction of the printing cylinder 12, and exerts a predetermined pressure.

(5) Housing Axially Holding Means 7

The housing axially holding means 7 is a block member having an L-shaped cross section, with the L-shaped short leg thereof mounted in contact with the side surface of the frame 6, and the projection 18 on the outside of the housing 5 slightly loosely interposed between the side surface of the L-shaped long leg and the side surface of the frame 6, so that the housing 5 can be held in such a manner as to circumferentially rotate and inhibit axial movement of the printing cylinder 12.

(6) Eccentric Part Rotating Means 8

The eccentric part rotating means 8 comprises an arm 22 mounted on the side surface of the intermediate ring 14 of the radial load supporting means 3, a drive coupling plate 19 rotatably connected to a tip of the arm 22 for transmitting a circumferential external force to the intermediate ring 14 via the arm 22, and a drive source (not shown) for imparting drive force to the drive coupling plate 19. Transmission of drive force is accomplished by causing the drive source to push or pull the drive coupling plate 19 in the direction parallel to the tangential line of the outer circumference of the intermediate ring 14, that is, in the direction vertical to the paper surface in FIG. 1 (the same applies to FIGS. 2 and 3), thereby pushing or pulling the tip of the arm 22 to cause the tip of the arm 22 to rotate around the centerline of the hole 13 of the frame 6, so that the intermediate ring 14 of the radial-load supporting means 3 that is connected to the arm 22 to move integrally with the arm 22, and the housing 5 connected to the intermediate ring 14 can be rotated around the centerline of the hole 13 of the frame 6 as the fulcrum.

With the bearing device 1 of the printing cylinder 12 embodying the present invention having the aforementioned construction, as the printing cylinder 12 of the printing press is caused to rotate to start printing operation, a radial load in the radial direction and a thrust loading in the axial direction are produced in the printing cylinder 12. The radial load is sustained by the radial-load supporting means 3 of the bearing device 1, while the thrust loading on the printing cylinder 12 is by the angular contact ball bearings 4. In this way, the bearing device 1 supports the printing cylinder 12 by sustaining the radial load and the thrust loading by separate load carrying means.

In order to cause the printing cylinder 12 to move between the printing position and the non-printing position, drive force is transmitted to the arm 22 from the drive source of the eccentric part rotating means 8 by pushing or pulling the drive coupling plate 19. The intermediate ring 14 of the radial-load supporting means 3 connected to the arm 22 is rotated between the needle row having a plurality of needles 17 disposed along the outer circumferential surface of the intermediate ring 14 and the outer circumferential surface of the intermediate ring 14 around the centerline of the hole 13 of the frame 6 as the fulcrum. The housing 5 connected to the intermediate ring 14 is rotated integrally with the intermediate ring 14 in a state where the axial movement of the printing cylinder 12 is inhibited by the housing axially holding means 7. More specifically, the housing 5 is rotated while the surface of projection 18 on the side of the frame 6 is kept in contact with the frame 6. The printing cylinder 12 supported by the radial-load supporting means 3 and the angular contact ball bearing 4 fitted to the housing 5 is caused to move around the centerline of the off centered hole 13 of the frame 6 as the fulcrum. With this movement, the printing cylinder 12 moves between the printing position and the non printing position.

Figure 2:
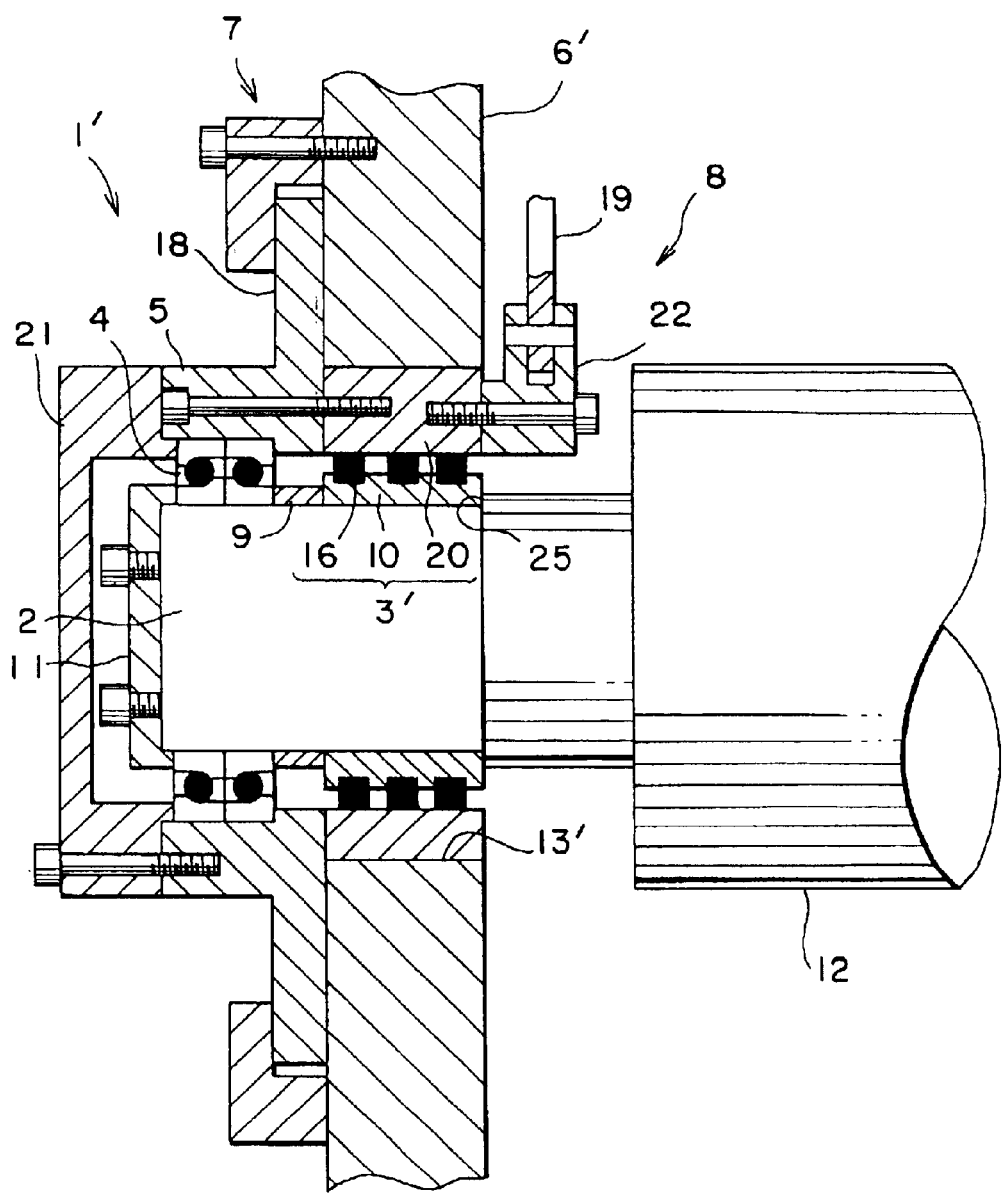
FIG. 2 is an approximate cross-sectional view of a printing cylinder bearing device as a second embodiment of the present invention.

The bearing device 1' of the printing cylinder 12 in the second embodiment shown in FIG. 2 is different the radial-load supporting means 3' from the embodiment shown in FIG. 1.

That is, the radial-load supporting means 3' is fitted to the shaft 2 of the printing cylinder 12 and also to the hole 13' of the frame 6', so as to make the printing cylinder 12 rotatable with respect to the frame 6', as shown in FIG. 2. The radial load supporting means 3' comprises an inner ring 10, an outer ring 20, and a radial-load sustaining cylindrical roller row having a plurality of cylindrical rollers 16 disposed along the outer circumferential surface of the inner ring 10 between the inner ring 10 and the outer ring 20.

The inner ring 10 of the radial-load supporting means 3' is a ring-shaped member having a centerline at a position misaligned with the centerline of the hole 13' of the frame 6', has an inside diameter equal to the outside diameter of the shaft 2 of the printing cylinder 12, and is fitted to the shaft 2. The outer ring 20 thereof is an eccentric ring-shaped member having an inside diameter sharing a centerline with the inner ring 10, and an outside diameter sharing a centerline with the hole 13' of the frame 6', and rotatably fitted to the hole 13' of the frame 6'. The outer ring 20 is also connected to the housing 5 via bolts, so that the outer ring 20 and the housing are integrally rotated around the centerline of the hole 13' of the frame 6' as the fulcrum. A plurality of cylindrical roller rows having a plurality of cylindrical rollers 16 disposed along the outer circumferential surface of the inner ring 10 are disposed between the outer ring 20 and the inner ring 10 in such a manner as to carry radial load in the radial direction of the printing cylinder 12.

The bearing device 1' of the printing cylinder 12 in the second embodiment has the thrust-loading supporting means 4, the housing 5, the housing axially holding means 7, and the eccentric part rotating means 8 that are all the same as described with reference to the embodiment shown in FIG. 1, except for the radial-load supporting means 3'. Since these components are the same as those in the first embodiment, description of them is omitted here.

The bearing device 1' of the printing cylinder 12 in the second embodiment having the aforementioned construction supports the printing cylinder 12 by sustaining the radial- and thrust-loadings generated by the printing cylinder 12 via the radial-load supporting means 3' and the angular contact ball bearings 4 both fitted to the shaft 2 of the printing cylinder and disposed separately, as in the embodiment shown in FIG. 1.

To cause the printing cylinder 12 to move between the printing position and the non-printing position, drive force is transmitted to the arm 22 from the drive source of the eccentric part rotating means 8 by pushing or pulling the drive coupling plate 19. The outer ring 20 of the radial-load supporting means 3' connected to the arm 22 is rotated between the outer circumferential surface of the outer ring 20 and the inner circumferential surface of the hole 13' around the centerline of the hole 13' of the frame 6' as the fulcrum. The housing 5 connected to the outer ring 20 is also rotated, together with the outer ring 20, in a state where the axial movement of the printing cylinder 12 is inhibited by the housing axially holding means 7. More specifically, the housing 5 is rotated while the surface of the projection 18 on the side of the frame 6' is kept in contact with the frame 6'. The printing cylinder 12 supported by the radial-load supporting means 3' and the angular contact ball bearings 4 fitted to the housing 5 is moved using as the fulcrum the misaligned centerline of the hole 13' of the frame 6'. With this movement, the printing cylinder 12 is moved between the printing position and the non-printing position.

Figure 3:
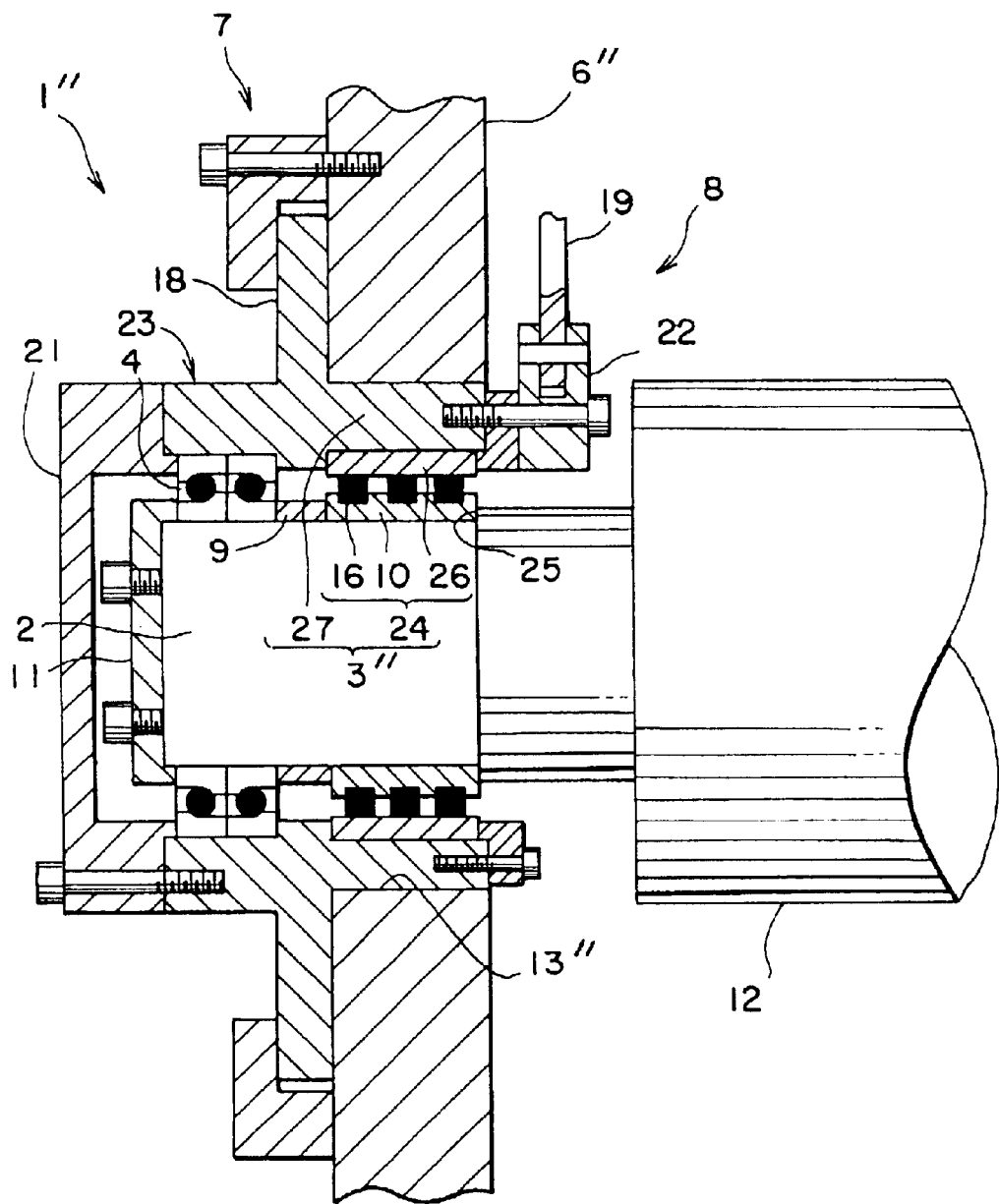
FIG. 3 is an approximate cross-sectional view of a printing-cylinder bearing device as a third embodiment of the present invention.

The bearing device 1" of the printing cylinder of the third embodiment shown in FIG. 3 is different in the radial-load supporting means 3" from the embodiment shown in FIG. 1.

That is, the radial-load supporting means 3" is fitted to the shaft 2 of the printing cylinder 12 and also to the hole 13" of the frame 6" in such a manner as to make the printing cylinder 12 rotatable with respect to the frame 6", as shown in FIG. 3. The radial-load supporting means 3" comprises an inner ring 10, an outer ring 26, a cylindrical roller bearing 24 having a cylindrical roller row for sustaining radial load having a plurality of cylindrical rollers 16 disposed along the outer circumferential surface of the inner ring 10 between the inner ring 10 and the outer ring 26, and an eccentric sleeve 27 having the cylindrical roller bearing 24 fitted to the inner circumferential surface thereof, and fitted to the hole 13" of the frame 6". In the embodiment shown in the figure, the eccentric sleeve 27 is formed integrally with the housing 5, which will be described later.

The inner ring 10 of the cylindrical roller bearing 24 is a ring-shaped member having a centerline at a position deviating from the centerline of the hole 13" of the frame 6", having an inside diameter of the inner ring 10 equal to the outside diameter of the shaft 2 of the printing cylinder 12, and fitted to the shaft 2. The outer ring 26 of the cylindrical roller bearing 24 is a ring-shaped member sharing a centerline with the inner ring 10, fitted to the inner circumferential surface of the eccentric sleeve 27, which will be described later. A plurality of cylindrical roller rows having a plurality of cylindrical rollers 16 disposed along the outer circumferential surface of the inner ring 10 for carrying radial load in the radial direction of the printing cylinder 12 are disposed between the inner ring 10 and the outer ring 20.

The centerline of the inside diameter of the eccentric sleeve 27 agrees with the centerline of the printing cylinder 12, and the inside diameter of the eccentric sleeve 27 is equal to the outside diameter of the outer ring 26 of the cylindrical roller bearing 24. The cylindrical roller bearing 24 is fitted to the inside diameter of the eccentric sleeve 27. The outside diameter of the eccentric sleeve 27 shares a centerline with the hole 13" of the frame 6", and is rotatably fitted to the hole 13" of the frame 6". That is, the centers of the inside and outside diameters of the eccentric sleeve 27 are eccentric with each other.

The bearing device 1" of the printing cylinder 12 of the third embodiment having the aforementioned construction has the thrust-loading supporting means 4, the housing 23, the housing axially holding means 7 and the eccentric part rotating means 8, in addition to the radial-load supporting means 3". Since these components have essentially the same construction as in the previous embodiments, except that the housing 23 is formed integrally with the eccentric sleeve 27 of the radial-load supporting means 3", description of them is omitted here. Needless to say, the housing 23 maybe formed as a separate member independently of the eccentric sleeve 27, and both members connected with bolts.

The bearing device 1" of the printing cylinder 12 of the third embodiment supports the printing cylinder 12 by sustaining radial and thrust loadings generated by the printing cylinder 12 separately by the cylindrical roller bearing 24 of the radial-load supporting means 3" and the angular contact ball bearing 4, both fitted to the shaft 2 of the printing cylinder 12 and separately disposed, as in the case of the previous embodiments, as shown in FIG. 3.

To cause the printing cylinder 12 to move between the printing position and the non printing position, drive force is transmitted to the arm 22 from the drive source of the eccentric part rotating means 8 by pushing or pulling the drive coupling plate 19. The eccentric sleeve 27 to which the cylindrical roller bearing 24 connected to the arm 22 is fitted, and the housing 23 to which the angular contact ball bearing 4 is fitted and which is integrally formed with the eccentric sleeve 27 are rotated between the outer circumferential surface of the eccentric sleeve 27 and the inner circumferential surface of the hole 13" around the centerline of the hole 13" of the frame 6" as the fulcrum. The housing 23 is rotated, together with the eccentric sleeve 27, in a state the axial movement of the printing cylinder 12 is inhibited by the housing axially holding means 7. More specifically, the housing 23 is rotated while the surface of the projection 18 on the side of the frame 6" is kept in contact with the frame 6". The printing cylinder 12 supported by the cylindrical roller bearing 24 fitted to the eccentric sleeve 27 and the angular contact ball bearing 4 fitted to the housing 23 is moved around the misaligned centerline of the hole 13" of the frame 6". With this movement, the printing cylinder 12 is moved between the printing position and the non printing position.

As described with reference to FIGS. 1, 2 and 3, the radial-load supporting means 3 and the thrust-loading supporting means 4 for sustaining the radial load and the thrust loading on the printing cylinder 12 generated by printing operation are provided separately and fitted to the shaft 2 of the printing cylinder 12. If any one of the bearing means is broken, therefore, it can be easily replaced with a new one. Furthermore, the housing 5 (in FIGS. 1 and 2) or 23 (in FIG. 3) is held with respect to the frame 6, or 6', or 6" in such a manner as to inhibit the axial movement of the printing cylinder 12, and a single bearing row is provided as the bearing means for sustaining thrust loading between the housing 5 or 23 and the shaft 2 of the printing cylinder 12. With this arrangement, plays due to the use of multiple bearing rows can be reduced to a considerable degree compared with the conventional type, and plays due to thrust loading can be minimized.

In a printing-cylinder bearing device where the printing cylinder is rotatably supported in such a manner that the printing cylinder can be moved between the printing position and the non-printing position around the centerline of the hole of a supporting member that is misaligned with the centerline of the printing cylinder, the radial-load supporting means for sustaining the radial load generated in the radial direction of the printing cylinder by the rotation of the printing cylinder, and the thrust-loading supporting means for sustaining the thrust loading acting in the axial direction of the printing cylinder are separately provided and fitted to the shaft of the printing cylinder. With this arrangement, even if any one bearing means is broken, only the broken bearing means can be replaced with a new one. Thus, maintenance can be made easy.

The housing is provided on a supporting member in such a manner as to inhibit the axial movement of the printing cylinder, and a single bearing row is provided as the thrust-loading supporting means for sustaining thrust loading between the housing and the shaft of the printing cylinder. With this arrangement, plays due to the use of multiple bearing rows can be minimized, resulting in improved printing accuracy.

By using angular contact ball bearings as the thrust-loading supporting means, the thrust loading onto the printing cylinder can be efficiently sustained.

What is claimed is:

1. A printing-cylinder bearing device for causing a supporting member to rotating support a printing cylinder in such a manner that the printing cylinder can be moved between a printing position and a non-printing position, the improvement comprising radial-load supporting means having between the supporting member and a shaft of the printing cylinder at least an eccentric part that can be rotated around the centerline of a hole provided on the supporting member and has a hole whose centerline is misaligned with the hole provided on the supporting member, a housing that is provided interlocked with the eccentric part and in such a manner as to inhibit the axial movement of the printing cylinder with respect to the supporting member, thrust-loading supporting means provided between the housing and the shaft of the printing cylinder and separately buttressing said printing cylinder with said radial-load supporting means, and eccentric part rotating means for causing the eccentric part to rotate around the centerline of the hole on the supporting member and can hold the rotated position of the eccentric part.

2. A printing-cylinder bearing device as claimed in claim 1 wherein the thrust-loading supporting means is angular contact ball bearings.

3. A printing-cylinder bearing device as claimed in claim 2 wherein the angular contact ball bearings are a set of angular contact bail bearings that are provided face-to-face or back-to-bank in the loading direction.

4. A printing-cylinder bearing device as claimed in claim 1, wherein the radial-load supporting means is a radial-load bearing having an outer ring and an intermediate ring, both sharing a centerline an inner ring whose centerline is misaligned with the centerline of the outer ring and the intermediate ring, and rolling members each interposed between the inner ring and the intermediate ring, and between the outer ring and the intermediate ring; the intermediate ring being rotatable around the centerline of the hole of the supporting member.

5. A printing-cylinder bearing device as claimed in claim 4 wherein the rolling members interposed between the inner ring and the intermediate ring, the centerlines of both of which are misaligned with each other, and between the outer ring and the intermediate ring, both sharing a centerline, are cylindrical rollers.

6. A printing-cylinder bearing device a claimed in claim 4 wherein the rolling members between the inner ring and the intermediate ring, the centerlines of both of which are misaligned with each other, are cylindrical rollers, and the rolling members between the outer ring and the intermediate ring, both sharing a centerline, are needles.

7. A printing-cylinder bearing device as claimed in claim 1, wherein the radial-load supporting means is a radial-load bearing having an inner ring and an outer ring, the centerlines of both of which are misaligned with each other, and rolling members interposed between the inner ring and the outer ring the outer ring being rotatable around the centerline of the hole of the supporting member.

8. A printing-cylinder bearing device as claimed in claim 7 wherein the rolling members Interposed between the inner ring and the outer ring, the centerlines of both of which are misaligned with each other, are cylindrical rollers.

9. A printing-cylinder bearing device as claimed in claim 1, wherein the radial-load supporting means comprises a radial-load bearing having an inner ring and an outer ring, both sharing a centerline, and rolling members Interposed between the inner ring and the outer ring, and an eccentric sleeve having the radial-load bearing fitted to the inner circumferential surface thereof, and an outer circumferential surface whose centerline is misaligned with the Inner circumferential surface thereof, the eccentric sleeve being rotatable around the centerline of the hole of the supporting member.

10. A printing-cylinder bearing device as set forth in claim 9 wherein the rolling members interposed between the inner ring and the outer ring, both sharing a centerline, are cylindrical rollers.

11. A printing-cylinder bearing device as set forth in claim 1, wherein the eccentric part rotating means comprises an arm installed on the aide surface of the eccentric part of the radial-load supporting means, a drive coupling plate rotatably connected to a tip of the arm for transmitting a circumferential external force via the arm to a member that is rotatable around the centerline of the hole of the support member.

12. A printing-cylinder bearing device as set forth in claim 1, wherein the housing has a hub that is slightly loosely interposed between the side surface of the same for supporting the radial-load supporting means and the inner surface of the housing axially holding means that is a L-section block installed on the side surface of the frame in such a manner as to rotatably hold the housing in the circumferential direction and inhibit the axial movement of the printing cylinder.

13. A printing-cylinder bearing device as set forth in claim 1, wherein a shouldered part having a diameter smaller than the outside diameter of the printing cylinder is provided on the shaft of the printing cylinder so that the axial position of the radial-load supporting means and the thrust-load supporting means can be fixed, and a first bearing bolder having a collar for positioning the radial-load supporting means for exciting a predetermined preload to the radial-load supporting means is provided at an end of the shaft of the printing cylinder, and a second bearing holder is installed on an end face of the housing opposite to the frame; the first and second bearing holders positioning the radial-load supporting means in the axial direction of the printing cylinder to exert a predetermined preload.

14. A printing-cylinder bearing device as claimed in claim 2, wherein the radial-load supporting means as a radial-load bearing having an outer ring and an intermediate ring, both sharing a centerline, an inner ring whose centerline is misaligned with the centerline of the outer ring and the intermediate ring, and rolling members each interposed between the inner ring and the intermediate ring, and between the outer ring and the intermediate ring; the intermediate ring being rotatable around the centerline of the hole of the supporting member.

15. A printing-cylinder bearing device as claimed in claim 2, wherein the radial-load supporting means as a radial-load beaming having an inner ring and an outer ring, the centerlines of both of which are misaligned with each other, and rolling members interposed between the inner ring and the outer ring; the outer ring being rotatable around the centerline of the hole of the supporting member.

16. A printing-cylinder bearing device as claimed in claim 2, wherein the radial-load supporting means comprises a radiaload bearing having an inner ring and an outer ring, both sharing a centerline, and rolling members interposed between the inner ring and the outer ring, and an eccentric sleeve having the radial-load bearing fitted to the inner circumferential surface thereof, and am outer circumferential surface whose centerline is misaligned with the inner circumferential surface thereof, the eccentric sleeve being rotatable around the centerline of the hole of the supporting member.

17. A printing-cylinder bearing device as set forth in claim 2, wherein the eccentric part rotating means comprises an arm installed on the side surface of the eccentric part of the radial-load supporting means, a drive coupling plate rotatably connected to a tip of the arm for transmitting a circumferential external force via the arm to a member that is rotatable around the centerline of the hole of the support member.

18. A printing-cylinder bearing device as set forth in claim 2, wherein the housing has a hub that is slightly loosely interposed between the side surface of the frame for supporting the radial-load supporting means and the inner surface of the housing axially holding means that is a L-section block installed on the side surface of the frame in such a manner as to rotatably hold the housing in the circumferential direction and inhibit the axial movement of the printing cylinder.

19. A printing-cylinder bearing device as set forth in claim 2, wherein a shouldered part having a diameter smaller than the outside diameter of the printing cylinder is provided on the shaft of the printing cylinder so that the axial position of the radial-load supporting means and the thrust-load supporting means can be fixed, and a first bearing holder having a collar for positioning the radial-load supporting means for exerting a predetermined preload to the radial-load supporting means is provided at an end of the shaft of the printing cylinder, and a second bearing holder is installed on an end face of the housing opposite to the frame; the first and second bearing holders positioning the radial-load supporting means in the axial direction of the printing cylinder to exert a predetermined preload.

* * * * *